(12) United States Patent
Shiba

(10) Patent No.: US 9,702,973 B2
(45) Date of Patent: Jul. 11, 2017

(54) ENVIRONMENT MEASUREMENT SYSTEM AND ENVIRONMENT MEASUREMENT METHOD

(71) Applicant: NEC Corporation, Minato-ku, Tokyo (JP)

(72) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 101 days.

(21) Appl. No.: 14/647,356

(22) PCT Filed: Nov. 13, 2013

(86) PCT No.: PCT/JP2013/006680
§ 371 (c)(1),
(2) Date: May 26, 2015

(87) PCT Pub. No.: WO2014/083790
PCT Pub. Date: Jun. 5, 2014

(65) Prior Publication Data
US 2015/0309173 A1    Oct. 29, 2015

(30) Foreign Application Priority Data
Nov. 27, 2012  (JP) ................................ 2012-258751

(51) Int. Cl.
*G01S 15/88*  (2006.01)
*G01S 7/539*  (2006.01)
(Continued)

(52) U.S. Cl.
CPC ............... *G01S 15/88* (2013.01); *G01H 5/00* (2013.01); *G01S 7/52004* (2013.01);
(Continued)

(58) Field of Classification Search
CPC .. G01H 5/00; G01S 15/88; G01S 7/60; G01S 15/42; G01S 7/52004; G01S 7/539
See application file for complete search history.

(56) References Cited

U.S. PATENT DOCUMENTS

| 4,924,449 A | * | 5/1990 | Guigne | ................... G01H 5/00 367/104 |
| 2009/0067290 A1 | * | 3/2009 | Londo | ................. G01S 7/52004 367/89 |
| 2015/0309173 A1 | * | 10/2015 | Shiba | ....................... G01H 5/00 367/100 |

FOREIGN PATENT DOCUMENTS

| GB | 1489908 A | * | 10/1977 | ............. G01V 1/303 |
| JP | 58-184525 A |  | 10/1983 | |

(Continued)

OTHER PUBLICATIONS

Reed, A Study of Underwater Sound Ray Tracing Methodology, Sep. 1990, pp. 1-100.*

(Continued)

*Primary Examiner* — Daniel Pihulic

(57) ABSTRACT

An environment measurement system according to the present invention is provided with a first unit comprising: a transmitter which is located undersea and transmits an acoustic wave in a designated direction a plurality of times; a first receiver which is located undersea and receives an acoustic wave reflected by a reflecting body at the sea surface or the seabed; a transmission direction setting unit which designates, to the transmitter, transmission directions specified in advance by a user, so as to cause the transmitter to transmit acoustic waves in the directions; a first necessary time measurement unit which, for each of the transmission directions, measures from the transmission and reception times of an acoustic wave a time necessary for the acoustic wave to return, as a necessary time, and outputs an average (Continued)

of the measured necessary time as an average necessary time for each of the transmission directions; a layer setting unit which partitions between the sea surface and the seabed into layers each extending horizontally, at intervals of preset distances; a simultaneous equations set-up unit which sets up simultaneous equations using the transmission directions, the necessary times and the layer thicknesses and taking average sound velocities in the respective layers as unknown variables; a simultaneous equations solving unit which solves the simultaneous equations; an initial parameter setting unit which sets initial values necessary for the simultaneous equations solving unit to solve the simultaneous equations, as parameter initial values; and a sound velocity profile output unit which creates a profile of sound velocities obtained by determining solutions acquired by the simultaneous equations solving unit to be average sound velocities in the respective layers and arranging the average sound velocities in the respective layers in order of depth, and outputs the profile.

8 Claims, 11 Drawing Sheets

(51) Int. Cl.
    *G01S 7/60*      (2006.01)
    *G01H 5/00*      (2006.01)
    *G01S 7/52*      (2006.01)
    *G01S 15/42*     (2006.01)
(52) U.S. Cl.
    CPC .............. *G01S 7/539* (2013.01); *G01S 7/60* (2013.01); *G01S 15/42* (2013.01)

(56) References Cited

FOREIGN PATENT DOCUMENTS

| JP | 60-131436 A | 7/1985 |
| JP | 61-134639 A | 6/1986 |
| JP | 2004-309265 A | 11/2004 |

OTHER PUBLICATIONS

Alexander Sy and Darren Wright, "XBT/XCTD Standard Test Procedures", International Oceanographic Commission (IOC) and World Meteorological Organization (WMO)—3rd Session of JCOMM Ship-of-Opportunity Implementation Panel (SOOPIP-III), Mar. 28-31, 2000, La Jolla, California, U.S.A.

Marine Acoustics Society of Japan, Ed, "Fundamentals and applications of marine acoustics", Seizando-Shoten Publishing, 2004, p. 218.

Uchida, "DP matching: Fundamentals and applications", IEICE Technical Report, PRMU 2006-166 (Dec. 2006).

Kaneko and Hori, "Robust object tracking method using small region block matching", Trans. IEICE, vol. J85-D-11I, No. 7, pp. 1188-1200, Jul. 2002.

Yamada et al., "Motion estimation of color moving images using an affine matching", ITEJ Technical Report vol. 16, No. 70, pp. 37-40.

International Search Report for PCT Application No. PCT/JP2013/006680, mailed on Dec. 10, 2013.

English translation for Write opinion of PCT Application No. PCT/JP2013/006680.

* cited by examiner

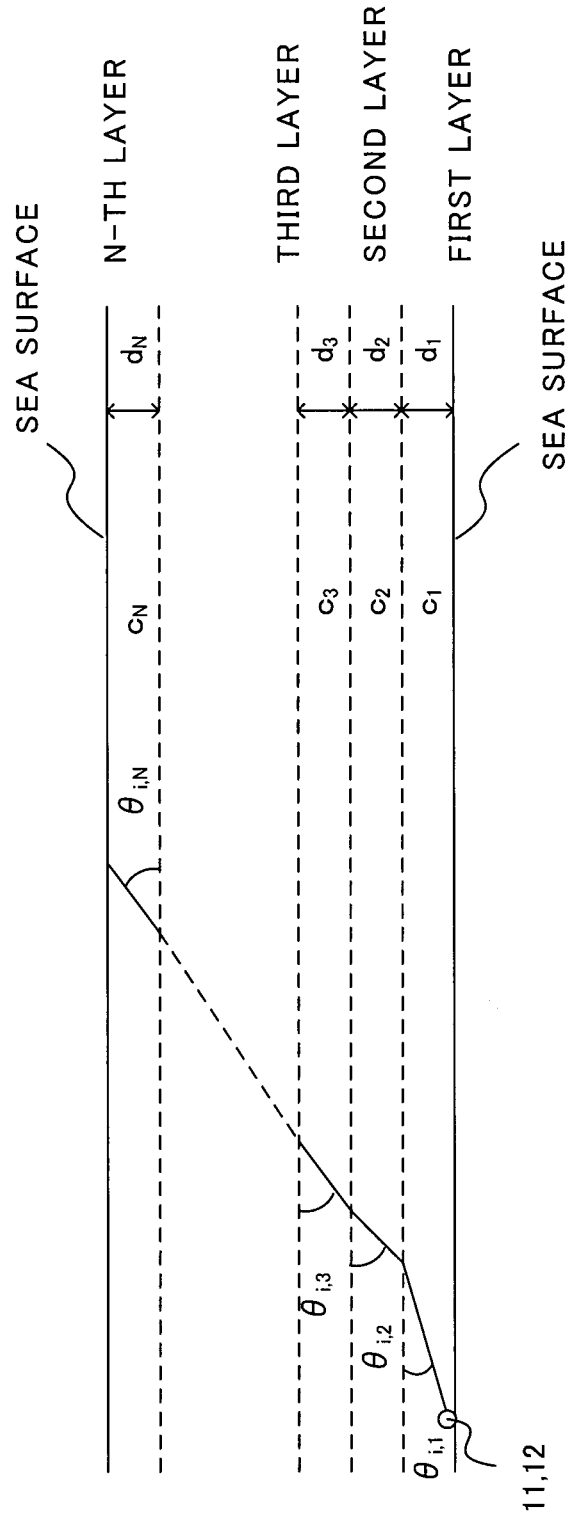

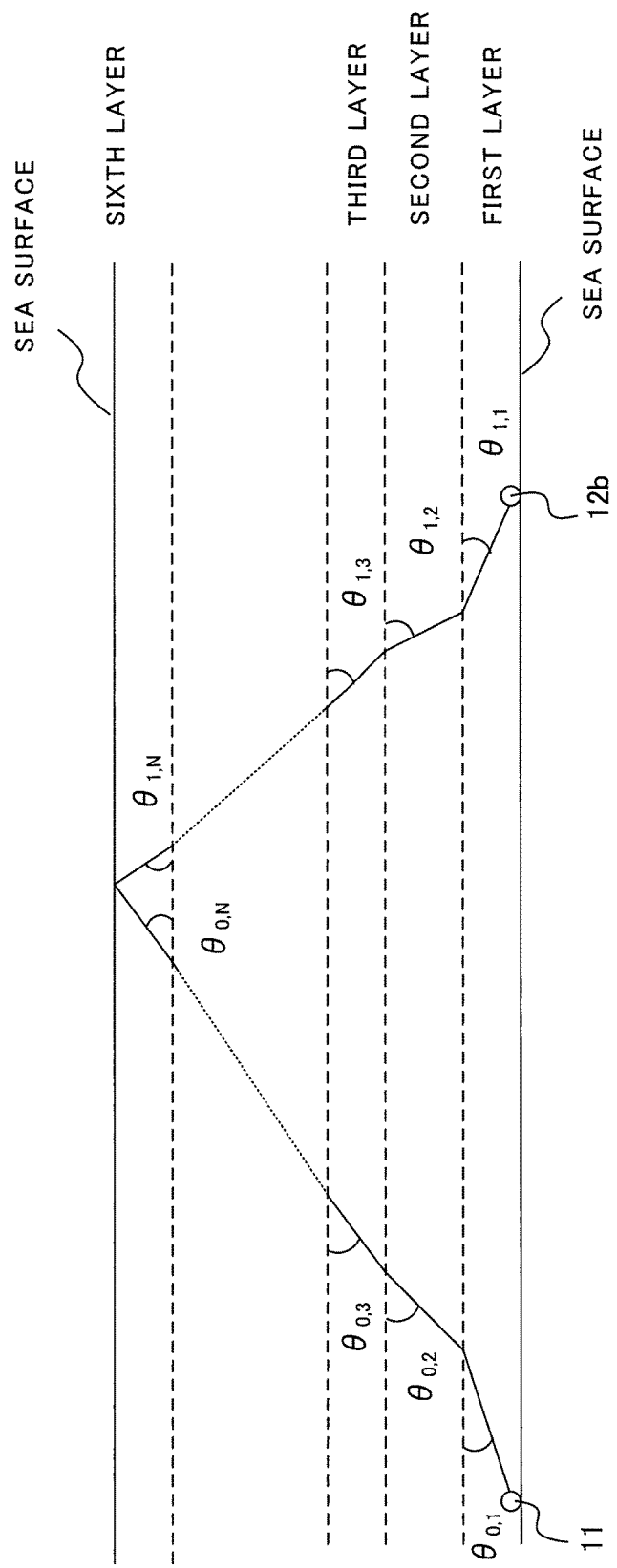

ENVIRONMENT MEASUREMENT SYSTEM AND ENVIRONMENT MEASUREMENT METHOD

This application is a National Stage Entry of PCT/JP2013/006680 filed on Nov. 13, 2013, which claims priority from Japanese Patent Application 2012-258751 filed on Nov. 27, 2012, the contents of all of which are incorporated herein by reference, in their entirety.

TECHNICAL FIELD

The present invention relates to an environment measurement system which estimates sound velocity distribution undersea by the use of a sonar, and also to an environment measurement method for performing the same.

BACKGROUND ART

For sonar systems, it is extremely important to grasp an acoustic wave propagation direction undersea. However, estimation of an acoustic wave propagation direction undersea is difficult, because the refractive index of acoustic wave varies depending on differences in temperature distribution, density distribution and salinity distribution.

In general, it is widely performed to measure temperature distribution of seawater in the vertical direction in advance of or simultaneously with undersea operation of a sonar system, or measure also salinity distribution simultaneously with the temperature distribution, and accordingly to estimate distribution of the refractive index of acoustic wave from the measured temperature distribution only or from both of the measured temperature and salinity distributions.

For example, as described in Non-patent Literature 1, a device for measuring only temperature distribution is generally referred to as XBT, and a device for measuring both temperature distribution and salinity distribution as XCTD. It is needless to say that, even without actually performing such measurement, estimation of sound velocity distribution from an average of previous measurement results is also widely performed, Also widely used is a method referred to as ocean acoustic tomography which, as Non-patent Literature 2 describes its outline, directly measures sound velocity distribution by installing a plurality of transmitter/receivers distributively in a target area of the sea and operating them to transmit and receive acoustic waves to and from each other.

CITATION LIST (Non-Patent Literature)
(Non-patent Literature 1) Alexander Sy and Darren Wright, "XBT/XCTD Standard Test Procedures", International Oceanographic Commission (IOC) and World Meteorological Organization (WMO)—3rd Session of JCOMM Ship-of-Opportunity Implementation Panel (SOOPIP-III), Mar. 28-31, 2000, La Jolla, Calif., U.S.A.
(Non-patent Literature 2) Marine Acoustics Society of Japan, Ed, "Fundamentals and applications of marine acoustics", Seizando-Shoten Publishing, 2004, p. 218.

DISCLOSURE OF INVENTION

Technical Problem

However, because XBT and XCTD are devices of one-time-use, they have a problem in that, when it is necessary to grasp sound velocity distribution frequently for a long time, a huge number of such devices are required, and the cost increases accordingly.

Although a variable-depth type measurement device to be used in a manner of being suspended from a buoy can also be considered, it still has a problem in that a large cost is required for producing such a device having endurance against long time operation with frequent depth change.

Further, because the above-described devices are the ones which estimate sound velocity distribution on the basis of a rule of thumb from temperature distribution only or from both temperature distribution and salinity distribution, but are not the ones which measure a sound velocity itself, there is concern about error occurrence.

On the other hand, the ocean acoustic tomography is the one which directly measures sound velocity distribution, but it requires installation of a plurality of transmitter/receivers, thus demanding a high cost, and furthermore, there may be a case, in some operation, where there is no opportunity of installing a plurality of transmitter/receivers. Further, the installation sites cannot be frequently changed. For the above reasons, the ocean acoustic tomography is not suitable for use in operation of a general sonar system which is not aiming at measuring sound velocity distribution itself.

Further, the ocean acoustic tomography requires setting up a network among measurement instruments located away from each other, and accordingly, buoys for communication are often used, which also is not suitable for rapidly changing the installation sites. Moreover, because of the buoys themselves being visible and of transmission and reception of radio waves for communication, there is a problem of low confidentiality.

In view of the problems described above, the main objective of the present invention is to provide an environment measurement system which estimates sound velocity distribution at a low cost by the use of a single transmitter, and also an environment measurement method for performing the same.

Solution to Problem

In order to solve the above-described problems, an environment measurement system according to the present invention is characterized by that it is provided with a first unit comprising: a transmitter which is located undersea and transmits an acoustic wave in a designated direction a plurality of times; a first receiver which is located undersea and receives an acoustic wave reflected by a reflecting body at the sea surface or the seabed; a transmission direction setting unit which designates, to the transmitter, transmission directions specified in advance by a user, so as to cause the transmitter to transmit acoustic waves in the directions; a first necessary time measurement unit which, for each of the transmission directions, measures from the transmission and reception times of an acoustic wave a time necessary for the acoustic wave to return, as a necessary time, and outputs an average of the measured necessary time as an average necessary time for each of the transmission directions; a layer setting unit which partitions between the sea surface and the seabed into layers each extending horizontally, at intervals of preset distances; a simultaneous equations set-up unit which sets up simultaneous equations using the transmission directions, the necessary times and the layer thicknesses and setting average sound velocities in the respective layers as unknown variables; a simultaneous equations solving unit which solves the simultaneous equations; an initial parameter setting unit which sets initial values necessary for the simultaneous equations solving unit to solve the simultaneous equations, as parameter initial values; and a sound velocity profile output unit which creates a profile of sound velocities obtained by determining solutions acquired by the simultaneous equations solving unit to be average sound velocities in the respective layers and arranging the average sound velocities in the respective layers in order of depth, and outputs the profile.

An environment measurement method according to the present invention is characterized by that it comprises: a transmission process for transmitting an acoustic wave in a designated direction a plurality of times; a first reception process for receiving an acoustic wave reflected by a reflecting body at the sea surface or the seabed; a transmission direction setting process for designating transmission directions specified in advance by a user, so as to cause acoustic waves to be transmitted in the directions; a first necessary time measurement process for measuring, for each of the transmission directions, from the transmission and reception times of an acoustic wave a time necessary for the acoustic wave to return, as a necessary time, and outputting an average of the measured necessary time as an average necessary time, for each of the transmission directions; a layer setting process for partitioning between the sea surface and the seabed into layers each extending horizontally, at intervals of a preset distance; a simultaneous equations set-up process for setting up simultaneous equations using the transmission directions, the necessary times and the layer thicknesses and taking the average sound velocities in the respective layers as unknown variables; a simultaneous equations solving process for solving the simultaneous equations; an initial parameter setting process for setting initial values necessary for the simultaneous equations solving unit to solve the simultaneous equations, as parameter initial values; and a sound velocity profile output process for creating a profile of sound velocities obtained by determining solutions acquired by the simultaneous equations solving unit to be average sound velocities in the respective layers and by arranging the average sound velocities in the respective layers in order of depth, and for outputting the profile.

Advantageous Effects of Invention

According to the present invention, as a result of transmitting acoustic waves in a plurality of directions from a transmitter, setting up simultaneous equations taking sound velocities as unknown variables, and then acquiring average sound velocities by solving the simultaneous equations, it becomes possible to estimate sound velocity distribution at a low cost even with a single transmitter.

BRIEF DESCRIPTION OF DRAWINGS

FIG. 2A is a diagram showing a state of partitioning between the sea surface and the seabed into a plurality of layers, where an example of layer setting of when measuring reflected sound from the sea surface is shown, FIG. 10 is a diagram showing a state of partitioning between the sea surface and the seabed into a plurality of layers.

DESCRIPTION OF EMBODIMENTS

Figure 1:
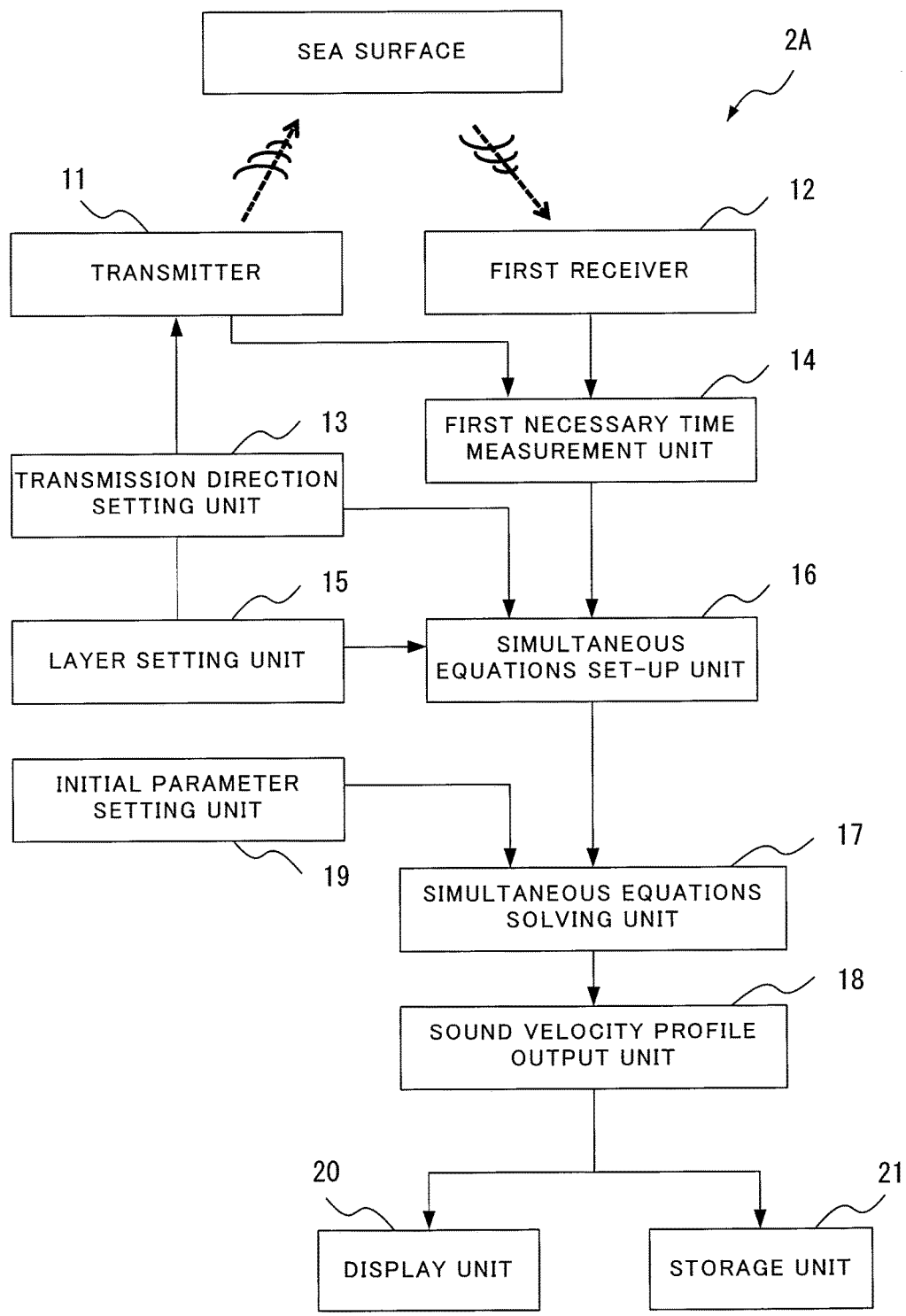
FIG. 1 is a block diagram of an environment measurement system according to a first exemplary embodiment of the present invention.

Hereinafter, exemplary embodiments of the present invention will be described. FIG. 1 is a block diagram of an environment measurement system 2A according to a first exemplary embodiment. The environment measurement system 2A includes a transmitter 11, a first receiver 12, a transmission direction setting unit 13, a first necessary time measurement unit 14, a layer setting unit 15, a simultaneous equations set-up unit 16, a simultaneous equations solving unit 17, a sound velocity profile output unit 18, an initial parameter setting unit 19, a display unit 20 and a storage unit 21. Here, the display unit 20 and the storage unit 21 may be optional components of the environment measurement system 2A. That is, the display unit 20 and the storage units 21 do not need to be exclusive devices to the environment measurement system 2A, but may be devices shared with another system.

The transmitter 11 transmits an acoustic wave into a sea a plurality of times in each transmission direction. As an example of the transmitter 11, what can be mentioned is a configuration comprising a plurality of acoustic elements which each convert an electrical signal into an acoustic signal by means of piezoelectric effect, electrostrictive effect, magnetostrictive effect or the like.

The transmitter 11 transmits an acoustic wave a plurality of times in each of directions designated by the transmission direction setting unit 13, and outputs a transmission time for each of the transmissions to the first necessary time measurement unit 14.

The first receiver 12 receives an acoustic wave reflected at the sea surface (a reflecting body), and outputs the received signal and the reception time to the first necessary time measurement unit 14. As an example of the first receiver 12, what can be mentioned is a configuration comprising a plurality of acoustic elements which each convert an electrical signal into an acoustic signal by means of piezoelectric effect, electrostrictive effect, magneto strictive effect or the like.

It is also possible to employ a sensor performing both transmission and reception by comprising an element into which both transmission and reception functions are incorporated, or a sensor performing both transmission and reception by comprising both an element having a transmission function and that having a reception function. When both of the transmission and reception functions are incorporated into a single device, the device is occasionally called a transmitter/receiver.

The transmission direction setting unit 13 specifies, to the transmitter 11, directions in which acoustic waves should be transmitted (transmission directions), and also outputs the specified transmission directions to the simultaneous equations set-up unit 16. The transmission directions need to be different from each other only in vertical direction. There is no need of specifying a horizontal direction in particular.

The number of the directions needs to be equal to or larger than the number of layers set by the layer setting unit 15. The transmission direction setting unit 13 outputs a transmission direction for each measurement of a necessary time, which is described below, to the simultaneous equations set-up unit 16.

The first necessary time measurement unit 14 calculates a time having been spent for transmission/reception of an acoustic wave (necessary time), from a transmission time at which the acoustic wave was transmitted by the transmitter 11 and a reception time at which the acoustic wave was received by the first receiver 12 after being reflected at the sea surface.

The necessary time is calculated as the difference between the transmission time and the reception time. There, because the transmitter 11 performs acoustic wave transmission a plurality of times in the same transmission direction, measurement of the necessary time is also performed a plurality of times. Accordingly, the first necessary time measurement unit 14 calculates an average of the plurality of necessary times measured as above, and outputs the average as an average necessary time to the simultaneous equations set-up unit 16.

Figure 2B:
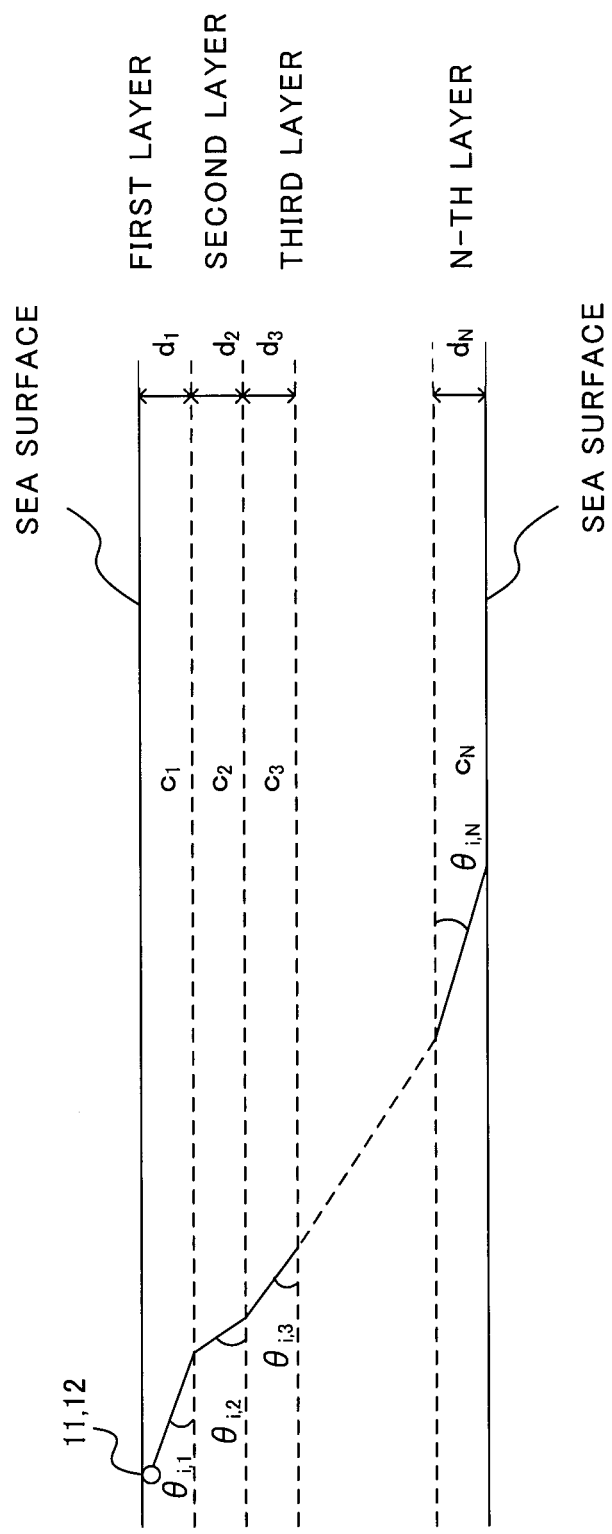
FIG. 2B is a diagram showing a state of partitioning between the sea surface and the seabed into a plurality of layers, where an example of layer setting of when measuring reflected sound from the seabed is shown.

The layer setting unit 15 partitions between the sea surface and the seabed into a plurality of (a predetermined number of) virtual layers which are parallel to the sea surface. FIGS. 2A and 2B, which will be described later, each show a state of partitioning between the sea surface and the seabed in that way. It is assumed that the number and thicknesses of the layers are optional, and is determined in advance. Here, the number of the layers may not exceed that of transmission directions set by the transmission direction setting unit 13. It is assumed that the sound velocity is constant within each of the layers, and the sound velocity is defined as the average sound velocity in the layer. By reducing the layer thicknesses and thereby increasing the number of layers, sound velocity distribution can be estimated with higher accuracy.

The simultaneous equations set-up unit 16 sets up simultaneous equations where the thicknesses of the respective layers set by the layer setting unit 15 are taken as known variables and the average sound velocities of the respective layers set by the layer setting unit 15 are taken as unknown variables, using the transmission directions set by the transmission direction setting unit 13 and the average necessary times for the respective transmission directions obtained by the first necessary time measurement unit 14. Here, when the number of the layers exceeds that of the transmission directions, the number of layers is reduced by specifying layers to use, so as to adjust it to the number of the transmission directions.

The initial parameter setting unit 19 sets initial values of the parameters for solving the simultaneous equations (hereafter, referred to as parameter initial values). The parameter initial values are not set when they are unnecessary.

The simultaneous equations solving unit 17 solves the simultaneous equations set up by the simultaneous equation set-up unit 16 by the use of the parameter initial values, and thereby acquires average sound velocities in the respective layers.

The sound velocity profile output unit 18 creates a sound velocity profile by arranging the acquired average sound velocities of the respective layers in order of depth. The sound velocity profile is outputted to and displayed at the display unit 20, and is also outputted to and stored in the storage unit 21.

The display unit 20 is a device constituted by a computer display or the like, which displays the sound velocity profile in a form of graphic information such as a graph of sound velocity against depth or numerical character information.

The storage unit 21 is a device constituted by a hard disk or the like, which stores the sound velocity profile. When storing the sound velocity profile, it may be correlated with the sea area, the time of the measurement or the like.

The above-described description has been given of a case where an acoustic wave from the transmitter 11 is reflected at the sea surface and then received by the first receiver 12, but the present exemplary embodiment is not limited to that configuration. For example, an environment measurement system of the present invention may also be that shown in FIG. 3 or FIG. 4.

Figure 3:
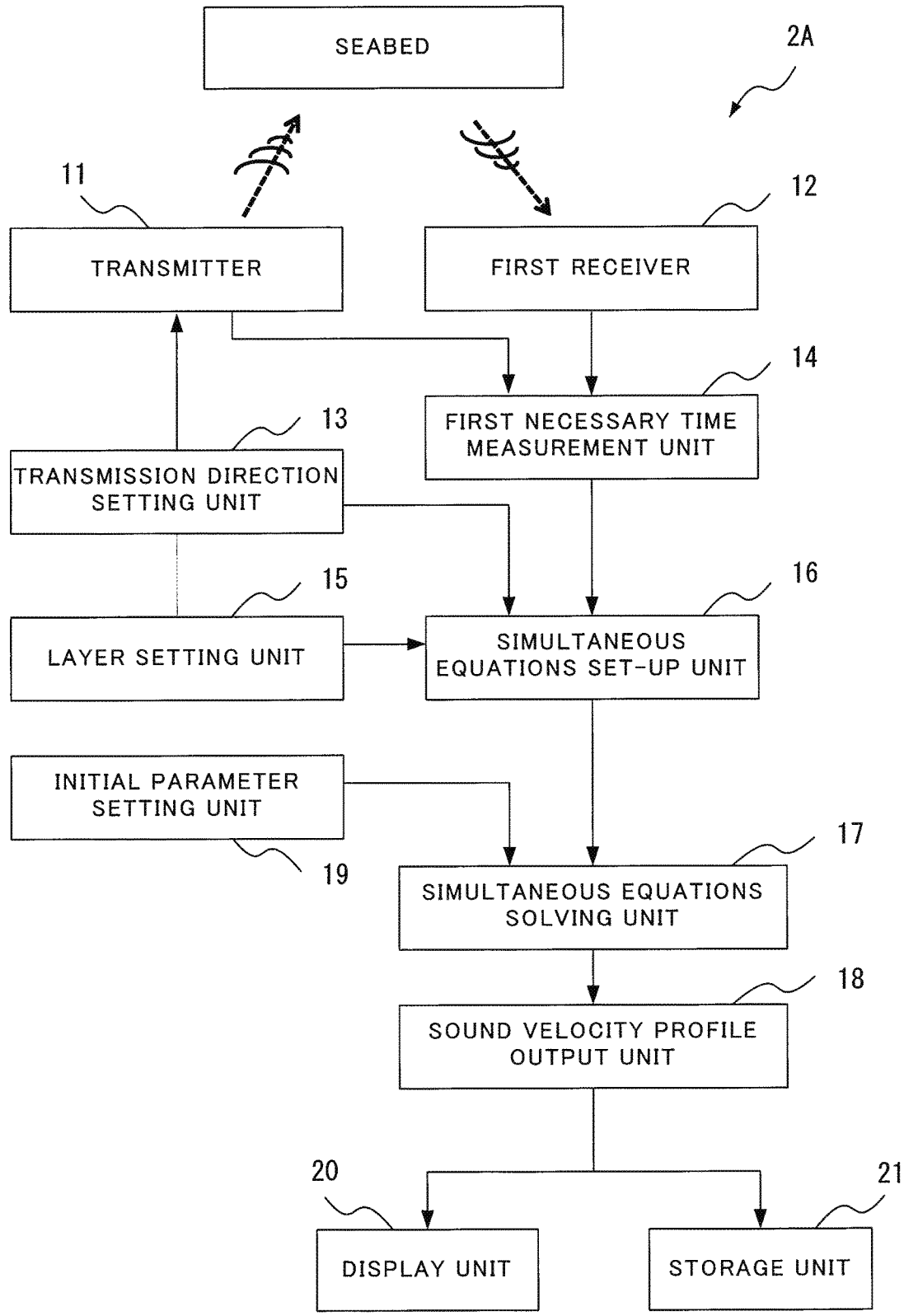
FIG. 3 is a block diagram of a system, replacing the environment measurement system shown in FIG. 1, for detecting reflected sound from the seabed.

The environment measurement system shown in FIG. 3 is that of a case where an acoustic wave from the transmitter 11 is reflected at the seabed (reflecting body) and then the first receiver 12 receives the reflected wave. There, it is assumed that the seabed is flat and has almost no unevenness.

Figure 4:
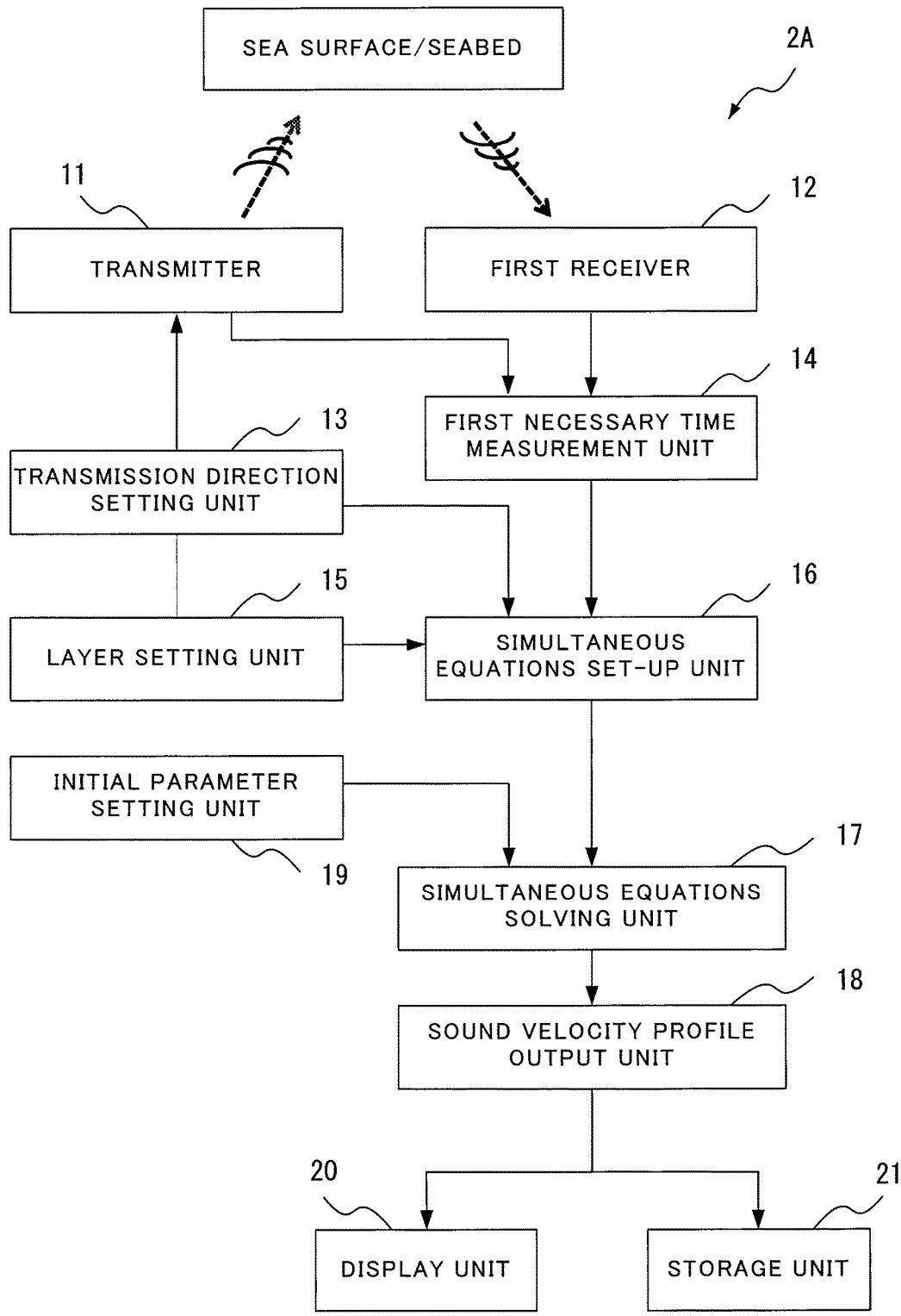
FIG. 4 is a block diagram of a system, replacing the environment measurement system shown in FIG. 1, for detecting reflected sound from both the sea surface and the seabed.

The environment measurement system shown in FIG. 4 has a configuration of receiving both reflected sound from the sea surface and that from the seabed. In this case, the transmitter and receiver are located undersea, and for upward directions with reference to the horizontal direction, the same operation as that by the environment measurement system shown in FIG. 1 is performed, and a sound velocity profile is thereby acquired by the sound velocity profile output unit 18 and is determined to be an upward sound velocity profile. For downward directions, the same operation as that by the environment measurement system shown in FIG. 3 is performed, and a sound velocity profile is thereby acquired by the sound velocity profile output unit 18 and is determined to be a downward sound velocity profile. Subsequently, by the sound velocity profile output unit 18 arranging the two sound velocity profiles in order of depth, a total sound velocity profile between the sea surface and the seabed is obtained.

Next, a detail description will be given of the simultaneous equations set-up unit 16 and the simultaneous equations solving unit 17, with reference to FIGS. 2A and 2B. FIG. 2A is a diagram showing a state of partitioning between the sea surface and the seabed into a plurality of layers, where an example of layer setting for when measuring reflected sound from the sea surface is shown. FIG. 2B also is a diagram showing a state of partitioning between the sea surface and the seabed into a plurality of layers, where an example of layer setting for when measuring reflected sound from the seabed is shown.

In FIG. 2A, between the sea surface and the seabed is partitioned into first to N-th layers (N; a positive integer) respectively having thicknesses $d_1$ to $d_N$, from the seabed. In contrast, in FIG. 2B, the partitioning into first to N-th layers respectively having thicknesses $d_1$ to $d_N$ is made from the sea surface. The layer thicknesses $d_m$ can be set optionally.

The $c_n$ represents the average sound velocity of the n-th layer. An angle $\theta_{i,j}$ represents the incident angle of an acoustic wave from the j-th layer to the j+1-th layer with respect to the i-th transmission direction. The subscript "i" expresses the direction of an acoustic wave transmitted from the transmitter 11. Specifically, as will be described later, acoustic waves are emitted in a plurality of transmission directions from the transmitter 11. A subscript expressing any one of the transmission directions in that situation is "i". Here, k, i, j, m, N and the like are positive integers.

Using such layers as described above, the simultaneous equations set-up unit 16 sets up nonlinear simultaneous equations with the average sound velocities in the respective layers taken as unknown variables and with the transmission directions and the necessary times for the respective transmission directions taken as known variables. The simultaneous equations solving unit 17 solves the nonlinear simultaneous equations set up by the simultaneous equations set-up unit 16, by means of a successive numerical computation method already known.

For example, in the case of partitioning between the sea surface and the seabed into the layers shown in FIG. 2A, if expressing the necessary time for acoustic wave propagation from a sonar to the sea surface by T, the necessary time T with respect to the i-th transmission direction, for example, is given by the following equation, as a total of times necessary for passing through the respective layers.

$$\frac{d_1}{c_1 \sin\theta_{i,1}} + \frac{d_2}{c_2 \sin\theta_{i,2}} + \frac{d_3}{c_3 \sin\theta_{i,3}} + \ldots + \frac{d_N}{c_N \sin\theta_{i,N}} = T \quad (1)$$

Here, because the propagation direction of an acoustic wave when its passing through a layer changes according to the difference in density or the like between the layers, thus following Snell's law, the following relation stands.

$$\frac{\cos\theta_{i,1}}{c_1} = \frac{\cos\theta_{i,2}}{c_2} = \frac{\cos\theta_{i,3}}{c_3} = \ldots = \frac{\cos\theta_{i,N}}{c_N} \quad (2)$$

Accordingly, the necessary time T of the equation 1 is expressed as follows.

$$\frac{d_1}{c_1 \sin\theta_{i,1}} + \frac{d_2}{c_2\left\{1 - \left(\frac{c_2}{c_1}\right)^2 \cos^2\theta_{i,1}\right\}^{\frac{1}{2}}} + \frac{d_3}{c_3\left\{1 - \left(\frac{c_3}{c_1}\right)^2 \cos^2\theta_{i,1}\right\}^{\frac{1}{2}}} + \ldots + \frac{d_N}{c_N\left\{1 - \left(\frac{c_N}{c_1}\right)^2 \cos^2\theta_{i,1}\right\}^{\frac{1}{2}}} = T \quad (3)$$

Hereafter, the angle $\theta_{i,1}$ is described as $\theta_i$, for simplification.

It is assumed here that the incident angle of an acoustic wave from the first layer to the second layer is varied in N-number of ways, that is, from $\theta_1$ to $\theta_N$, and an echo arrival time $T_n$ from the sea surface is measured for each of the N-number of cases. Accordingly, N-number of simultaneous equations are obtained. In the present case, the echo arrival times $T_n$ are given by the following simultaneous equations.

$$\frac{d_1}{c_1 \sin\theta_1} + \frac{d_2}{c_2\left\{1 - \left(\frac{c_2}{c_1}\right)^2 \cos^2\theta_1\right\}^{\frac{1}{2}}} + \frac{d_3}{c_3\left\{1 - \left(\frac{c_3}{c_1}\right)^2 \cos^2\theta_1\right\}^{\frac{1}{2}}} + \ldots + \frac{d_N}{c_N\left\{1 - \left(\frac{c_N}{c_1}\right)^2 \cos^2\theta_1\right\}^{\frac{1}{2}}} = T_1 \quad (4)$$

$$\frac{d_1}{c_1 \sin\theta_2} + \frac{d_2}{c_2\left\{1 - \left(\frac{c_2}{c_1}\right)^2 \cos^2\theta_2\right\}^{\frac{1}{2}}} + \frac{d_3}{c_3\left\{1 - \left(\frac{c_3}{c_1}\right)^2 \cos^2\theta_2\right\}^{\frac{1}{2}}} + \ldots + \frac{d_N}{c_N\left\{1 - \left(\frac{c_N}{c_1}\right)^2 \cos^2\theta_2\right\}^{\frac{1}{2}}} = T_2$$

$$\frac{d_1}{c_1 \sin\theta_N} + \frac{d_2}{c_2\left\{1 - \left(\frac{c_2}{c_1}\right)^2 \cos^2\theta_N\right\}^{\frac{1}{2}}} + \frac{d_3}{c_3\left\{1 - \left(\frac{c_3}{c_1}\right)^2 \cos^2\theta_N\right\}^{\frac{1}{2}}} + \ldots + \frac{d_N}{c_N\left\{1 - \left(\frac{c_N}{c_1}\right)^2 \cos^2\theta_N\right\}^{\frac{1}{2}}} = T_N$$

When the sound velocities of respective ones of the N-number of layers are considered to be unknown values, the N-number of sound velocities can be obtained from the N-number of simultaneous equations.

Next, a function $f_n(C)$ is defined as follows.

$$f_n(C) = f_n(c_1, c_2, \ldots, c_N) \quad (5)$$

$$\equiv \frac{d_1}{c_1 \sin\theta_n} + \frac{d_2}{c_2\left\{1 - \left(\frac{c_2}{c_1}\right)^2 \cos^2\theta_n\right\}^{\frac{1}{2}}} + \frac{d_3}{c_3\left\{1 - \left(\frac{c_3}{c_1}\right)^2 \cos^2\theta_n\right\}^{\frac{1}{2}}} + \ldots + \frac{d_N}{c_N\left\{1 - \left(\frac{c_N}{c_1}\right)^2 \cos^2\theta_n\right\}^{\frac{1}{2}}} - T_n$$

Here, C is a vector. Using the function $f_n(C)$, the equation 4 is expressed as $$F(C) \equiv \begin{pmatrix} f_1(C) \\ f_2(C) \\ \vdots \\ f_N(C) \end{pmatrix} = 0 \quad (6)$$

Here, F(C) is a vector.

To solve such nonlinear simultaneous equations, various widely known methods can be used. The most often used methods are the bisection method and the Newton-Raphson method.

The bisection method is a method which, for example, first selects sound velocity values satisfying)

$$f_n(c_{1,i}, c_{2,i}, \ldots, c_{N,i}) \times f_n(c_{i,j}, c_{2,j}, \ldots, c_{N,j}) < 0$$

$c_{n,i} < c_{n,j}$ ($1 \leq n \leq N$, i and j are arbitrary integers)

then, taking the values as an initial estimation range of sound velocity values, successively narrows the estimation range of sound velocity values by repeatedly using the following formulas.

$$f_n(c_{1,i+1}, c_{2,i+1}, \ldots, c_{N,i+1}) \times f_n(c_{i,j+1}, c_{2,j+1}, \ldots, c_{N,j+1}) < 0$$

$c_{n,j} - c_{n,i} > c_{n,j+1} - c_{n,i+1}$ ($1 \leq n \leq N$, i and j are arbitrary integers)

Next, how to apply the Newton-Raphson method will be described. Here, expressing the average sound velocity of the n-th layer obtained at the k-th step of the Newton-Raphson method by a set of such average sound velocities is expressed by a vector as $$C_k \equiv \begin{pmatrix} c_{1,k} \\ c_{2,k} \\ \vdots \\ c_{N,k} \end{pmatrix} \tag{7}$$

Then, a set of average sound velocities $C_{K+1}$ at the k+1-th step of the Newton-Raphson method is expressed as $$C_{k+1} = C_k - \left\{ \frac{\partial F(c_k)}{\partial c} \right\}^{-1} F(C_k) \tag{8}$$

In the equation 8, $$\frac{\partial F(C)}{\partial c} = \begin{pmatrix} \frac{\partial f_1(c)}{\partial c_1} & \frac{\partial f_1(c)}{\partial c_2} & \cdots & \frac{\partial f_1(c)}{\partial c_N} \\ \frac{\partial f_2(c)}{\partial c_1} & \frac{\partial f_2(c)}{\partial c_2} & \cdots & \frac{\partial f_2(c)}{\partial c_N} \\ \vdots & \vdots & \ddots & \vdots \\ \frac{\partial f_N(c)}{\partial c_1} & \frac{\partial f_N c}{\partial c_2} & \cdots & \frac{\partial f_N(c)}{\partial c_N} \end{pmatrix} \tag{9}$$

is assumed.

The elements of the matrix in the equation 9 are expressed as $$\frac{\partial f_n(C)}{\partial c_1} = -\frac{d_1}{c_1^2 \sin\theta_n} - \frac{c_2 d_2 \cos^2\theta_n}{c_1^3 \left\{ 1 - \left(\frac{c_2}{c_1}\right)^2 \cos^2\theta_n \right\}^{\frac{3}{2}}} - \tag{10}$$

$$\frac{c_3 d_3 \cos^2\theta_n}{c_1^3 \left\{ 1 - \left(\frac{c_3}{c_1}\right)^2 \cos^2\theta_n \right\}^{\frac{3}{2}}} - \cdots - \frac{c_N d_N \cos^2\theta_n}{c_1^3 \left\{ 1 - \left(\frac{c_N}{c_1}\right)^2 \cos^2\theta_n \right\}^{\frac{3}{2}}}$$

$$\frac{\partial f_n(C)}{\partial c_m} = \frac{d_m \cos^2\theta_n}{c_1^2 \left\{ 1 - \left(\frac{c_m}{c_1}\right)^2 \cos^2\theta_n \right\}^{\frac{3}{2}}} - \frac{d_m}{c_m^2 \left\{ 1 - \left(\frac{c_m}{c_1}\right)^2 \cos^2\theta_n \right\}^{\frac{1}{2}}}$$

Here, it is assumed that initial values of the respective average sound velocities are set by the initial parameter setting unit 19 to be, for example, $$C_0 \equiv \begin{pmatrix} c_{1,0} \\ c_{2,0} \\ \vdots \\ c_{N,0} \end{pmatrix} \tag{11}$$

Substituting the sound velocities into the equation 10, then substituting the results into the equation 9, then calculating the inverse matrix, and then using the equation 8, average sound velocities at the next step is acquired. As a convergence condition, for example, a condition such as that update is stopped if the rate of changed portion becomes less than a constant value (such as less than 1%) may be used.

While the above description has been given of the case of applying the bisection method and the Newton-Raphson method to the following simultaneous equations, $$F(C)=0$$

it is also possible that, setting up $$G(C) = \sum_{i=1}^{N} |f_i(C)|^2$$

then either of the two methods is applied to the following simultaneous equations.

$$\frac{\partial G(C)}{\partial c_1} = 0, \quad \frac{\partial G(C)}{\partial c_2} = 0, \quad \ldots \quad \frac{\partial G(C)}{\partial c_N} = 0$$

Next, another calculation method will be described. The calculation method utilizes the fact that differences in average sound velocity among the layers are generally small. When differences in average sound velocity among the layers are small, the equation 4 consisting of nonlinear simultaneous equations can be considered by approximating it by linear simultaneous equations.

First, notice is taken of that the n-th line of the equation 4 is $$\frac{d_1}{c_1 \sin\theta_n} + \frac{d_2}{c_2 \left\{ 1 - \left(\frac{c_2}{c_1}\right)^2 \cos^2\theta_n \right\}^{\frac{1}{2}}} + \tag{12}$$

$$\frac{d_3}{c_3 \left\{ 1 - \left(\frac{c_3}{c_1}\right)^2 \cos^2\theta_n \right\}^{\frac{1}{2}}} + \ldots + \frac{d_N}{c_N \left\{ 1 - \left(\frac{c_N}{c_1}\right)^2 \cos^2\theta_n \right\}^{1/2}} = T_n$$

and the m-th term in the left side of the equation is $$\tau_{n,m} \equiv \frac{d_m}{c_m \left\{ 1 - \left(\frac{c_m}{c_1}\right)^2 \cos^2\theta_n \right\}^{\frac{1}{2}}} \tag{13}$$

Here, the equation 13 is modified as $$\tau_{n,m} = \frac{d_m}{c_m \left\{ 1 - \left(\frac{c_m}{c_1}\right)^2 \cos^2\theta_n \right\}^{\frac{1}{2}}} \tag{14}$$

$$= \frac{d_m}{c_m \left\{ 1 - \left(\frac{c_m}{c_1}\right)^2 (1 - \sin^2\theta_n) \right\}^{\frac{1}{2}}}$$

$$= \frac{d_m}{c_m \left\{ 1 - \left(\frac{c_m}{c_1}\right)^2 + \left(\frac{c_m}{c_1}\right)^2 \sin^2\theta_n \right\}^{\frac{1}{2}}}$$

Further modification is made under the following condition.

$$\left|1-\left(\frac{c_m}{c_1}\right)^2\right| < \left|\left(\frac{c_m}{c_1}\right)^2 \sin^2\theta_n\right| \tag{15}$$

Then, the equation 14 can be expanded as follows.

$$\tau_{n,m} = \frac{d_m}{c_m\left\{1-\left(\frac{c_m}{c_1}\right)^2+\left(\frac{c_m}{c_1}\right)^2\sin^2\theta_n\right\}^{\frac{1}{2}}} = \tag{16}$$

$$\frac{d_m}{c_m}\sum_{k=0}^{\infty}(-1)^k \frac{(2k-1)!!\left\{1-\left(\frac{c_m}{c_1}\right)^2\right\}^k}{k!2^k\left(\frac{c_m}{c_1}\right)^{2k+1}\sin^{2k+1}\theta_n}$$

In the present approximation, with respect to $$1-\left(\frac{c_m}{c_1}\right)^2 \tag{17}$$

up to the first-order term is taken.
It results in $$\tau_{n,m} = \frac{d_m}{c_m}\sum_{k=0}^{\infty}(-1)^k \frac{(2k-1)!!\left\{1-\left(\frac{c_m}{c_1}\right)^2\right\}^k}{k!2^k\left(\frac{c_m}{c_1}\right)^{2k+1}\sin^{2k+1}\theta_n} \approx \tag{18}$$

$$\frac{d_m}{c_m\left(\frac{c_m}{c_1}\right)\sin\theta_n}\left\{1-\frac{1-\left(\frac{c_m}{c_1}\right)^2}{2\left(\frac{c_m}{c_1}\right)^2\sin^2\theta_n}\right\}$$

Substituting the equation 18 into the equation 12, an equation 19 is obtained.

$$\frac{d_1}{c_1\sin\theta_n} + \frac{d_2}{c_2\left\{1-\left(\frac{c_2}{c_1}\right)^2\cos^2\theta_n\right\}^{\frac{1}{2}}} + \tag{19}$$

$$\frac{d_3}{c_3\left\{1-\left(\frac{c_3}{c_1}\right)^2\cos^2\theta_n\right\}^{\frac{1}{2}}} + \ldots + \frac{d_N}{c_N\left\{1-\left(\frac{c_N}{c_1}\right)^2\cos^2\theta_n\right\}^{\frac{1}{2}}} = T_n$$

$$\frac{d_1}{c_1\sin\theta_n} + \frac{d_2}{c_2\left(\frac{c_2}{c_1}\right)\sin\theta_n}\left\{1-\frac{1-\left(\frac{c_2}{c_1}\right)^2}{2\left(\frac{c_2}{c_1}\right)^2\sin^2\theta_n}\right\} +$$

$$\frac{d_3}{c_3\left(\frac{c_3}{c_1}\right)\sin\theta_n}\left\{1-\frac{1-\left(\frac{c_3}{c_1}\right)^2}{2\left(\frac{c_3}{c_1}\right)^2\sin^2\theta_n}\right\} + \ldots + \ldots +$$

$$\frac{d_m}{c_m\left(\frac{c_m}{c_1}\right)\sin\theta_n}\left\{1-\frac{1-\left(\frac{c_m}{c_1}\right)^2}{2\left(\frac{c_m}{c_1}\right)^2\sin^2\theta_n}\right\} + \ldots +$$

$$\frac{d_N}{c_N\left(\frac{c_N}{c_1}\right)\sin\theta_n}\left\{1-\frac{1-\left(\frac{c_N}{c_1}\right)^2}{2\left(\frac{c_N}{c_1}\right)^2\sin^2\theta_n}\right\} = T_n$$

Further arranging the equation 19, $$\frac{d_1}{c_1\sin\theta_n} + \frac{d_2}{c_2\left(\frac{c_2}{c_1}\right)\sin\theta_n} - \frac{d_2\left\{1-\left(\frac{c_2}{c_1}\right)^2\right\}}{2c_2\left(\frac{c_2}{c_1}\right)^3\sin^3\theta_n} + \tag{20}$$

$$\frac{d_3}{c_3\left(\frac{c_3}{c_1}\right)\sin\theta_n} - \frac{d_3\left\{1-\left(\frac{c_3}{c_1}\right)^2\right\}}{2c_3\left(\frac{c_3}{c_1}\right)^3\sin^3\theta_n} + \ldots + \ldots + \frac{d_m}{c_m\left(\frac{c_m}{c_1}\right)\sin\theta_n} -$$

$$\frac{d_m\left\{1-\left(\frac{c_m}{c_1}\right)^2\right\}}{2c_m\left(\frac{c_m}{c_1}\right)^3\sin^3\theta_n} + \ldots + \frac{d_N}{c_N\left(\frac{c_N}{c_1}\right)\sin\theta_n} - \frac{d_N\left\{1-\left(\frac{c_N}{c_1}\right)^2\right\}}{2c_N\left(\frac{c_N}{c_1}\right)^3\sin^3\theta_n} = T_n$$

is obtained.

Here, when measurement is made on 2N−1 number of different angles, the following simultaneous equations are obtained.

$$\frac{d_1}{c_1\sin\theta_1} + \frac{d_2}{c_2\left(\frac{c_2}{c_1}\right)\sin\theta_1} - \frac{d_2\left\{1-\left(\frac{c_2}{c_1}\right)^2\right\}}{2c_2\left(\frac{c_2}{c_1}\right)^3\sin^3\theta_1} + \ldots + \tag{21}$$

$$\frac{d_N}{c_N\left(\frac{c_N}{c_1}\right)\sin\theta_1} - \frac{d_N\left\{1-\left(\frac{c_N}{c_1}\right)^2\right\}}{2c_N\left(\frac{c_N}{c_1}\right)^3\sin^3\theta_1} = T_1$$

$$\frac{d_1}{c_1\sin\theta_2} + \frac{d_2}{c_2\left(\frac{c_2}{c_1}\right)\sin\theta_2} - \frac{d_2\left\{1-\left(\frac{c_2}{c_1}\right)^2\right\}}{2c_2\left(\frac{c_2}{c_1}\right)^3\sin^3\theta_2} + \ldots +$$

$$\frac{d_N}{c_N\left(\frac{c_N}{c_1}\right)\sin\theta_2} - \frac{d_N\left\{1-\left(\frac{c_N}{c_1}\right)^2\right\}}{2c_N\left(\frac{c_N}{c_1}\right)^3\sin^3\theta_2} = T_2$$

$$\vdots$$

$$\frac{d_1}{c_1\sin\theta_{2N-1}} + \frac{d_2}{c_2\left(\frac{c_2}{c_1}\right)\sin\theta_{2N-1}} - \frac{d_2\left\{1-\left(\frac{c_2}{c_1}\right)^2\right\}}{2c_2\left(\frac{c_2}{c_1}\right)^3\sin^3\theta_{2N-1}} + \ldots +$$

$$\frac{d_N}{c_N\left(\frac{c_N}{c_1}\right)\sin\theta_{2N-1}} - \frac{d_N\left\{1-\left(\frac{c_N}{c_1}\right)^2\right\}}{2c_N\left(\frac{c_N}{c_1}\right)^3\sin^3\theta_{2N-1}} = T_{2N-1}$$

The simultaneous equations can be rewritten as $$\begin{pmatrix} \frac{d_1}{\sin\theta_1} & \frac{d_2}{\sin\theta_1} & \frac{d_2}{\sin^3\theta_1} & \cdots & \frac{d_N}{\sin\theta_1} & \frac{d_N}{\sin^3\theta_1} \\ \frac{d_1}{\sin\theta_2} & \frac{d_2}{\sin\theta_2} & \frac{d_2}{\sin^3\theta_2} & \cdots & \frac{d_N}{\sin\theta_2} & \frac{d_N}{\sin^3\theta_2} \\ \vdots & \vdots & \vdots & \ddots & \vdots & \vdots \\ \frac{d_1}{\sin\theta_{2N-1}} & \frac{d_2}{\sin\theta_{2N-1}} & \frac{d_2}{\sin^3\theta_{2N-1}} & \cdots & \frac{d_N}{\sin\theta_{2N-1}} & \frac{d_N}{\sin^3\theta_{2N-1}} \end{pmatrix} \tag{22}$$

$$\begin{pmatrix} \frac{1}{c_1} \\ \frac{1}{c_2\left(\frac{c_2}{c_1}\right)} \\ -\frac{\left\{1-\left(\frac{c_2}{c_1}\right)^2\right\}}{2c_2\left(\frac{c_2}{c_1}\right)^3} \\ \vdots \\ \frac{1}{c_N\left(\frac{c_N}{c_1}\right)} \\ -\frac{\left\{1-\left(\frac{c_N}{c_1}\right)^2\right\}}{2c_N\left(\frac{c_N}{c_1}\right)^3} \end{pmatrix} = \begin{pmatrix} T_1 \\ T_2 \\ \vdots \\ T_{2N-1} \end{pmatrix}$$

Here, if definition is made as, $$\Theta \equiv \begin{pmatrix} \frac{d_1}{\sin\theta_1} & \frac{d_2}{\sin\theta_1} & \frac{d_2}{\sin^3\theta_1} & \cdots & \frac{d_N}{\sin\theta_1} & \frac{d_N}{\sin^3\theta_1} \\ \frac{d_1}{\sin\theta_2} & \frac{d_2}{\sin\theta_2} & \frac{d_2}{\sin^3\theta_2} & \cdots & \frac{d_N}{\sin\theta_2} & \frac{d_N}{\sin^3\theta_2} \\ \vdots & \vdots & \vdots & \ddots & \vdots & \vdots \\ \frac{d_1}{\sin\theta_{2N-1}} & \frac{d_2}{\sin\theta_{2N-1}} & \frac{d_2}{\sin^3\theta_{2N-1}} & \cdots & \frac{d_N}{\sin\theta_{2N-1}} & \frac{d_N}{\sin^3\theta_{2N-1}} \end{pmatrix} \quad (23)$$

$$\Xi \equiv \begin{pmatrix} \frac{1}{c_1} \\ \frac{1}{c_2\left(\frac{c_2}{c_1}\right)} \\ -\frac{\left\{1-\left(\frac{c_2}{c_1}\right)^2\right\}}{2c_2\left(\frac{c_2}{c_1}\right)^3} \\ \vdots \\ \frac{1}{c_N\left(\frac{c_N}{c_1}\right)} \\ -\frac{\left\{1-\left(\frac{c_N}{c_1}\right)^2\right\}}{2c_N\left(\frac{c_N}{c_1}\right)^3} \end{pmatrix}$$

$$\Psi \equiv \begin{pmatrix} T_1 \\ T_2 \\ \vdots \\ T_{2N-1} \end{pmatrix}$$

the equation 22 can be solved in terms of the vector $\Xi$, because each and every component of the matrix $\Theta$ and of the vector $\Psi$ is known.

Here, because the matrix $\Theta$ needs to have an inverse matrix, $$d_n \neq d_m \ (n \neq m) \quad (24)$$

must be satisfied.

In the present case, sound velocities are calculated by setting up 2N-1 number of simultaneous equations with respect to N-number of unknown variables. Therefore, there are two possible solutions for each sound velocity. In that situation, as a final solution, a positive solution is taken if it only is positive between the two, and the average of the two solutions is taken if they are both positive.

While the present method requires performing the measurement with respect to about the double number of angles compared to the case of the Newton-Raphson method, it has an advantage of eliminating necessity of repeated computation, on the other hand.

By calculating the inverse matrix of the matrix $\Theta$ shown in the equation 23, the simultaneous equations solving unit 17 can easily obtain solutions of the simultaneous equations of the equation 22 described above.

Figure 5:
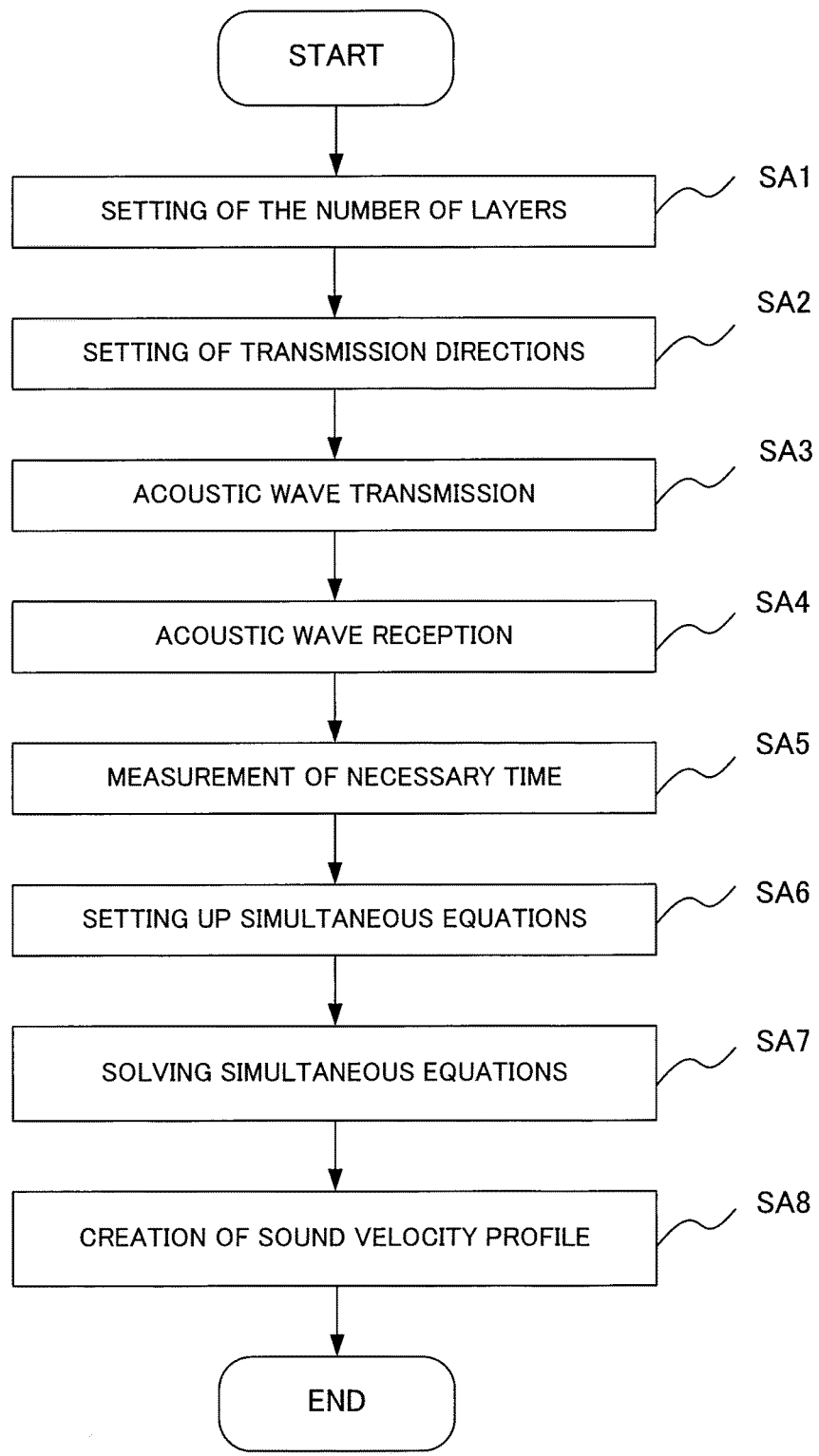
FIG. 5 is a flow chart showing a procedure of estimating sound velocity distribution in the environment measurement system according to the first exemplary embodiment.

Next, a description will be given of a sound velocity distribution estimation process in the above-described environment measurement system. FIG. 5 is a flow chart showing a procedure of the sound velocity distribution estimation process. The following description will be made taking as an example the case of using the equation 4 consisting of nonlinear simultaneous equations.

Step SA1: First, the layer setting unit 15 partitions between the sea surface and the seabed, corresponding to the measurement target, into a plurality of layers. It is matter of course that the layers are virtual ones, and the sound velocity within each layer is assumed to be constant. Then, the number of layers is outputted to the transmission direction setting unit 13.

Step SA2: Next, the transmission direction setting unit 13 sets a plurality of transmission directions, with reference to the number of layers, and outputs them to the transmitter 11 and the simultaneous equations set-up unit 16. Here, expressing the number of directions by $N_d$, and the number of layers by $N_L$, $N_d$ is set to be equal to or larger than $N_L$ ($N_d \geq N_L$).

Step SA3: On receiving designation of the transmission directions from the transmission direction setting unit 13, the transmitter 11 transmits an acoustic wave a plurality of times in each of the specified directions and outputs the transmission times to the first necessary time measurement unit 14.

Step SA4: The acoustic wave transmitted from the transmitter 11 is reflected at the sea surface or the seabed, and then received by the first receiver 12. The first receiver 12 outputs the time of the acoustic wave reception to the first necessary time measurement unit 14.

Step SA5: From the difference between the transmission time and the reception time, the first necessary time measurement unit 14 calculates a time having been necessary for the acoustic wave to propagate in the sea (necessary time). For each of the transmission directions, the necessary time is acquired a plurality of times, and the average of the acquired necessary times is outputted to the simultaneous equations set-up unit 16, as an average necessary time for the transmission direction. As acoustic waves are transmitted in a plurality of directions, the same number of average necessary times as that of transmission directions are acquired.

Step SA6: According to the method already described above, the simultaneous equations set-up unit 16 sets up simultaneous equations corresponding to the number of layers inputted from the layer setting unit 15.

Step SA7: Subsequently, the simultaneous equations thus set up are solved by the simultaneous equations solving unit 17, using initial values designated from the initial parameter setting unit 19, and average sound velocities of the respective layers are thereby acquired.

Step SA8: The sound velocity profile output unit 18 creates a sound velocity profile by arranging the average sound velocities of the respective layers in order of depth.

The sound velocity profile is outputted to and displayed at the display unit 20, and is also outputted to and stored in the storage unit 21.

As has been described above, it becomes possible to directly estimate a sound velocity profile by the use of only a single sonar system, and accordingly, acquisition of the sound velocity profile becomes low cost.

Second Exemplary Embodiment

Next, a second exemplary embodiment of the present invention will be described. Here, to the same configuration as that in the first exemplary embodiment, the same sign as that used in the first exemplary embodiment is assigned, and the description will be appropriately omitted.

Figure 6:
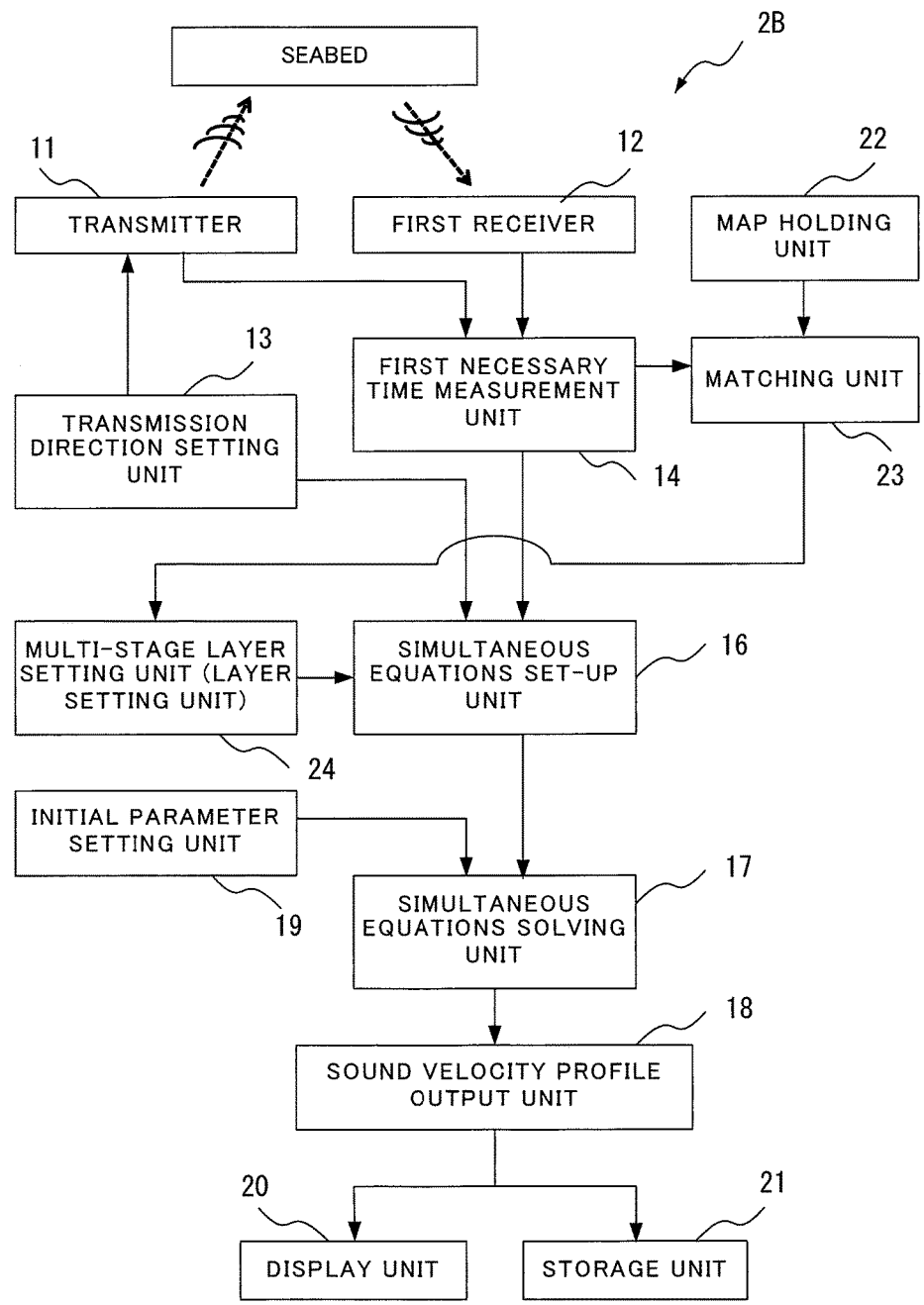
FIG. 6 is a block diagram of an environment measurement system according to a second exemplary embodiment of the present invention.

An environment measurement system 2B according to the present exemplary embodiment is shown in FIG. 6. The environment measurement system 2B is different from the environment measurement system 2A according to the first exemplary embodiment in that a map holding unit 22 and a matching unit 23 are additionally provided, and also in that the layer setting unit 15 is replaced by a multi-stage layer setting unit 24. Accordingly, the following description will be given of only different part from the first exemplary embodiment, omitting description of the same part.

The map holding unit 22 holds in advance a depth map of the seabed in a sea area to be measured.

Figure 7:
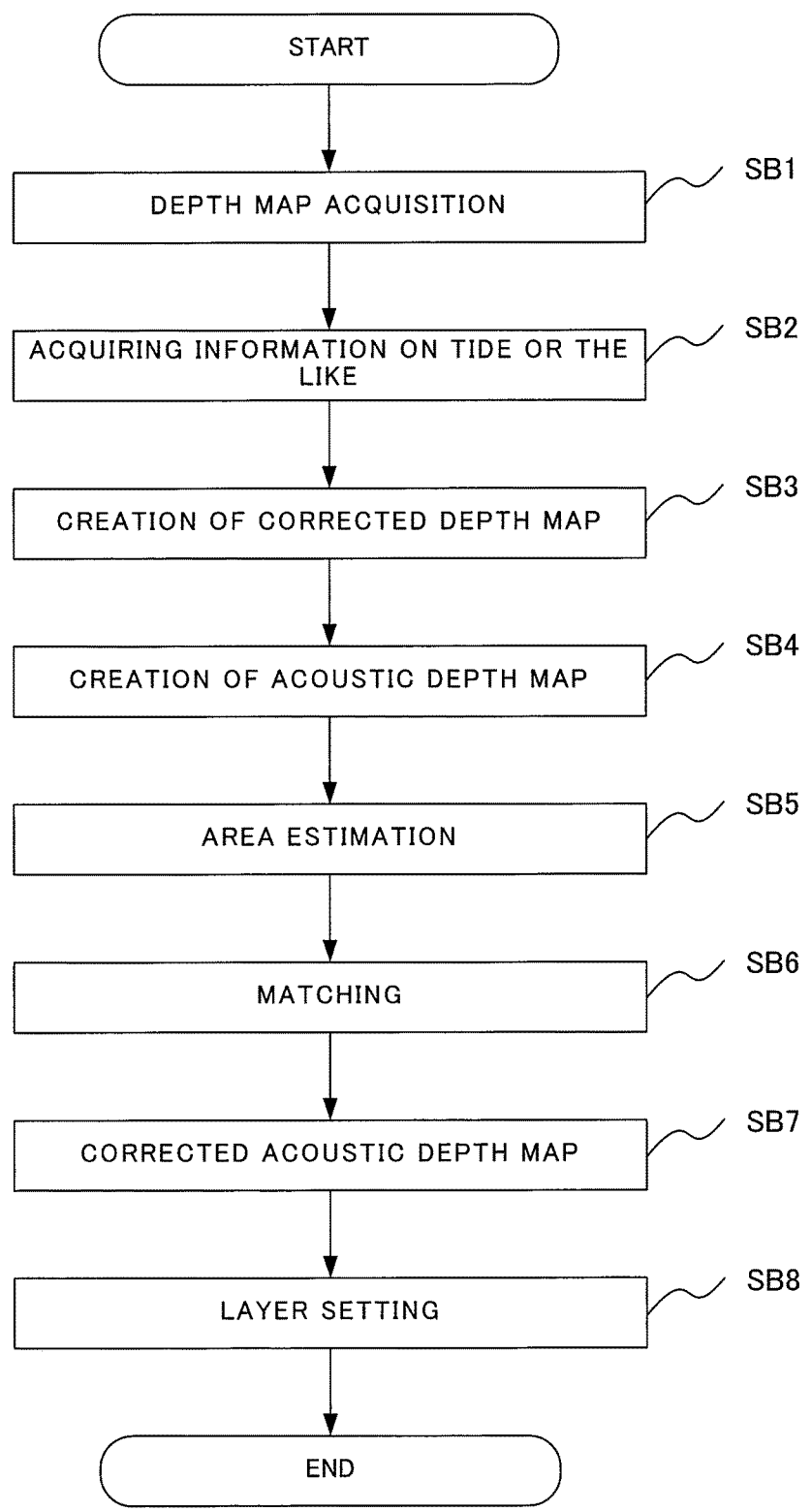
FIG. 7 is a flow chart showing a procedure of estimating sound velocity distribution in the environment measurement system according to the second exemplary embodiment.

The matching unit 23 creates a corrected acoustic depth map by performing a matching process between a corrected depth map created from the depth map held in advance and an acoustic depth map acquired by actual measurement. Then, on the basis of the corrected acoustic depth map, the multi-stage layer setting unit 24 partitions between the sea surface and the seabed into a plurality of layers. A procedure of creating the corrected acoustic depth map will be described according to a flow chart shown in FIG. 7.

Steps SB1 to SB3: The matching unit 23 finds a tide state from the measurement date and time, or the like, thereby corrects the depth values in a depth map acquired from the map holding unit 22, and holds the resultant depth map as a corrected depth map.

Step SB4: Next, from average necessary times for respective transmission directions obtained by the first necessary time measurement unit 14, the matching unit 23 creates a depth map of the seabed under approximation that acoustic waves propagate straight. Hereafter, thus created depth map is described as an acoustic depth map.

Steps SB5 and SB 6: With respect to each of a plurality of transmission directions set by the transmission direction setting unit 13, the matching unit 23 estimates at which part of the seabed an acoustic wave is reflected, under approximation that acoustic waves propagate straight. Then, it clips an area corresponding to the estimated area accompanied by a margin area (the margin area has been determined and set in advance), and acquires thus clipped areas as collectively a corrected depth map. It consequently performs matching between the corrected depth map and the acoustic depth map.

When sound velocity distribution exists, acoustic waves do not propagate straight. Therefore, the acoustic depth map may be distorted with reference to the corrected depth map. However, it is preferable that the matching can be performed even when the matching targets are distorted. As examples of such a matching method, Non-patent Literature 3 to Non-patent Literature 5, described below, can be mentioned. For example, Non-patent Literature 3 outlines a method which, because matching becomes not good if either of two patterns to be matched with each other has small distortion, expands or contracts either of the two patterns like rubber in the matching process, and determines a best matching state to be a matching result. Non-patent Literature 4 discloses a technology which divides matching targets and then performs matching on the divided parts. Further, Non-patent Literature 5 discloses a technology relating to an affine matching method which takes deformation of matching targets into consideration.

<Non-patent Literature 3> Uchida, "DP matching: Fundamentals and applications", IEICE Technical Report, PRMU 2006-166 (December 2006).

<Non-patent Literature 4> Kaneko and Hori, "Robust object tracking method using small region block matching", Trans. IEICE, Vol. J85-D-1II, No. 7, pp. 1188-1200, July 2002.

<Non-patent Literature 5> Yamada et al., "Motion estimation of color moving images using an affine matching", ITEJ Technical Report Vol. 16, No. 70, pp. 37-40.

Step SB7: Using such a matching method, matching between the corrected depth map and the acoustic depth map is performed and, from a result obtained by the matching, a depth map of when the average necessary times were measured (hereafter, referred to as a corrected acoustic depth map) is acquired.

Step SB8: Using the corrected acoustic depth map, the multi-stage layer setting unit 24 sets between the sea surface and the seabed to be layers shown in FIG. 8, for example.

Figure 8:
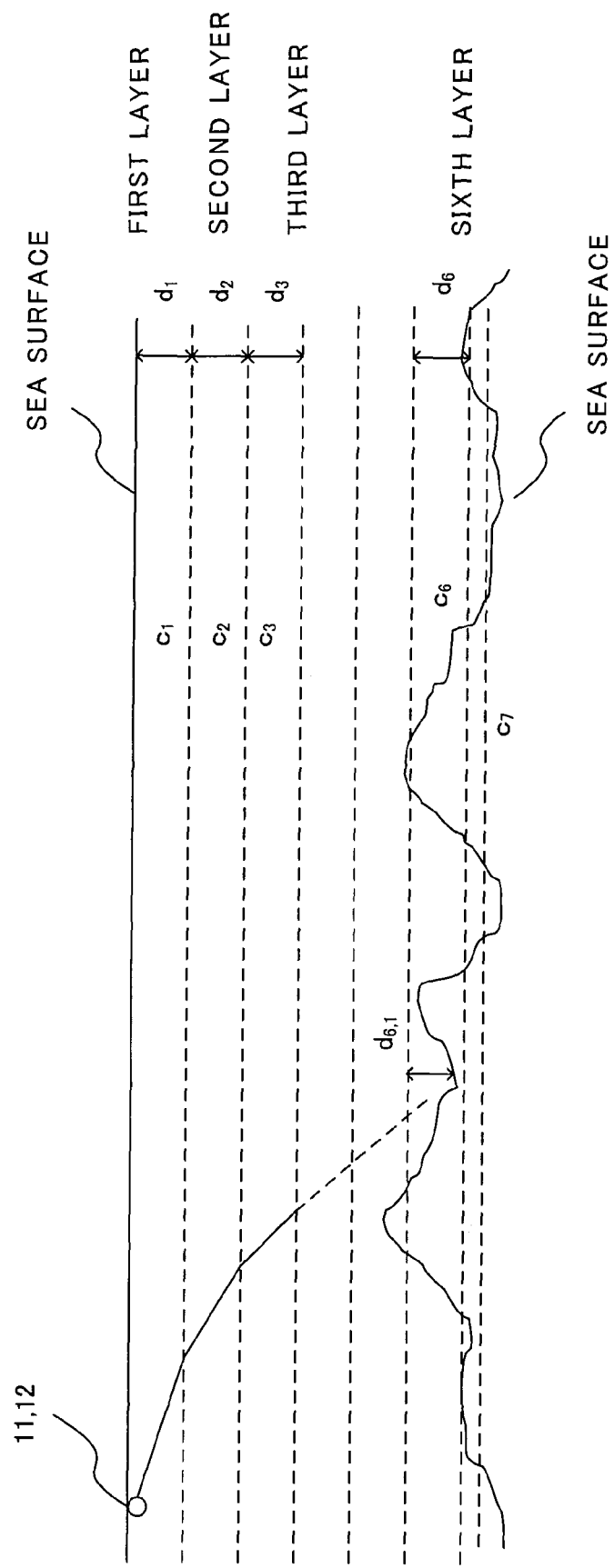
FIG. 8 is a diagram showing a state of partitioning between the sea surface and the seabed into a plurality of layers.

FIG. 8 is a diagram for when layer setting is performed on between the sea surface and the seabed having unevenness. The multi-stage layer setting unit 24 is different from the layer setting unit 15 in whether or not to require the above-described corrected acoustic depth map at a time of layer setting, but not different in the basic process.

However, because the layers set by the multi-stage layer setting unit 24 is in accordance with the actual seabed state, it becomes possible to perform appropriate layer setting regardless of the seabed state (whether it is level or not). Accordingly, it becomes possible to acquire a sound velocity profile dealing with general actual situations where the seabed is not level or not flat.

When the seabed has unevenness as in FIG. 8, the simultaneous equations are modified to be as follows, for example.

$$\frac{d_1}{c_1 \sin\theta_1} + \frac{d_2}{c_2\left\{1-\left(\frac{c_2}{c_1}\right)^2\cos^2\theta_1\right\}^{\frac{1}{2}}} + \quad (25)$$

$$\frac{d_3}{c_3\left\{1-\left(\frac{c_3}{c_1}\right)^2\cos^2\theta_1\right\}^{\frac{1}{2}}} + \ldots + \frac{d_{N,1}}{c_N\left\{1-\left(\frac{c_N}{c_1}\right)^2\cos^2\theta_1\right\}^{\frac{1}{2}}} = T_1$$

$$\frac{d_1}{c_1 \sin\theta_2} + \frac{d_2}{c_2\left\{1-\left(\frac{c_2}{c_1}\right)^2\cos^2\theta_2\right\}^{\frac{1}{2}}} + \frac{d_3}{c_3\left\{1-\left(\frac{c_3}{c_1}\right)^2\cos^2\theta_2\right\}^{\frac{1}{2}}} + \ldots +$$

$$\frac{d_{N,2}}{c_N\left\{1-\left(\frac{c_N}{c_1}\right)^2\cos^2\theta_2\right\}^{\frac{1}{2}}} = T_2$$

$$\vdots$$

$$\frac{d_1}{c_1 \sin\theta_N} +$$

-continued $$\frac{d_2}{c_2\left\{1-\left(\frac{c_2}{c_1}\right)^2\cos^2\theta_N\right\}^{\frac{1}{2}}}+\frac{d_3}{c_3\left\{1-\left(\frac{c_3}{c_1}\right)^2\cos^2\theta_N\right\}^{\frac{1}{2}}}+\ldots+$$

$$\frac{d_{N-1}}{c_N\left\{1-\left(\frac{c_{N-1}}{c_1}\right)^2\cos^2\theta_{N-1}\right\}^{\frac{1}{2}}}=T_N$$

The simultaneous equations express an example where thickness of the N-th layer for acoustic wave transmission in the first direction is different from that in the second direction, and the number of layers is only N−1 for transmission in the N-th direction. Calculation of the equation 9 is possible even in such a case. However, when the number of layers for a certain direction is too small to calculate the inverse matrix of the equation 9, the number of layers is increased so as to enable the inverse matrix calculation.

Third Exemplary Embodiment

Next, a third exemplary embodiment of the present invention will be described. To the same configuration as that in the first and second exemplary embodiments, the same sign as that used in the first and second exemplary embodiments is assigned also here, and the description will be appropriately omitted.

In each of the exemplary embodiments having been described hereinbefore, the environment measurement system comprises the transmitter and the first receiver, transmits acoustic waves at respective ones of N-number of transmission angles, receives their reflected sound, and thereby acquires N-number of nonlinear simultaneous equations. In contrast, in the present exemplary embodiment, it becomes possible to estimate sound velocity distribution even with a smaller number of acoustic wave transmission angles than the number of equations.

Figure 9:
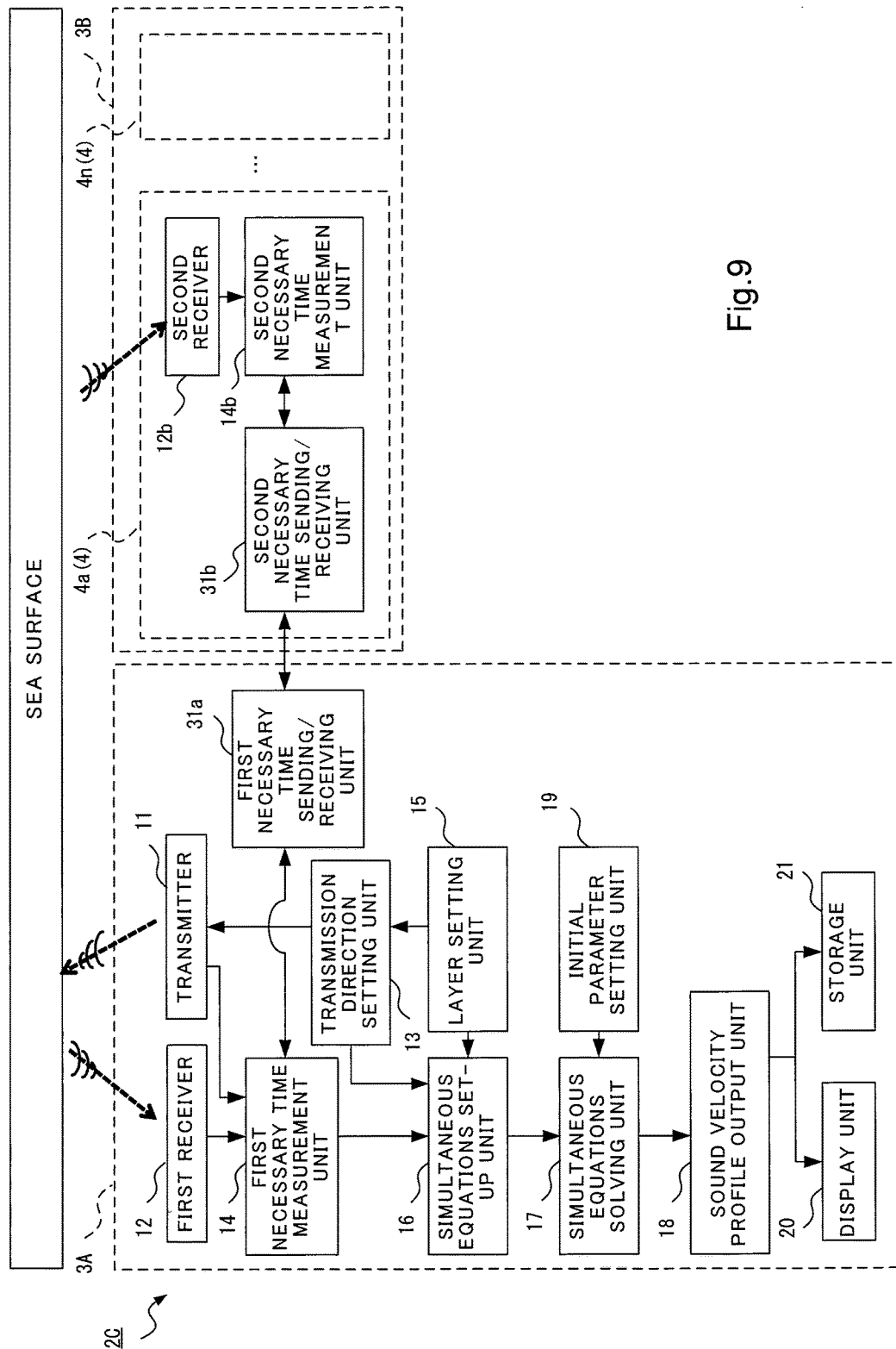
FIG. 9 is a block diagram of an environment measurement system according to a third exemplary embodiment of the present invention.

FIG. 9 is a block diagram of an environment measurement system 2C according to the present exemplary embodiment. FIG. 10 is a diagram of between the sea surface and the seabed partitioned into layers by the environment measurement system 2C. The environment measurement system 2C includes a first unit 3A and a second unit 3B.

The first unit 3A includes the transmitter 11, the first receiver 12, the transmission direction setting unit 13, the first necessary time measurement unit 14, the layer setting unit 15, the simultaneous equations set-up unit 16, the simultaneous equations solving unit 17, the sound velocity profile output unit 18, the initial parameter setting unit 19, the display unit 20, the storage unit 21 and a first necessary time sending/receiving unit 31a. Thus, the first unit 3A is a unit which is capable of transmission and reception of acoustic waves and is different from the environment measurement system 2A shown in FIG. 1 in that the first necessary time sending/receiving unit 31a is added.

On the other hand, the second unit 3B comprises a plurality of reception-only devices 4 (4a to 4n; n is a positive integer). Each reception-only device 4 includes a second receiver 12b, a second necessary time measurement unit 14b and a second necessary time sending/receiving unit 31b.

There, the second receiver 12b has approximately the same configuration as that of the first receiver 12, and the second necessary time measurement unit 14b as that of the first necessary time measurement unit 14. However, the second receiver 12b is additionally provided with a function to acquire reception directions, compared to the first receiver 12. It is because the reception directions also become necessary when simultaneous equations are set up using necessary times acquired by the second unit 3B.

Thus, the second unit 3B is a unit for reception only, which itself does not have a simultaneous equation set-up function or a simultaneous equation solving function, but the second unit 3B has a function to measure the necessary time and reception direction of a received acoustic wave and send the measured time from the second necessary time sending/receiving unit 31b to the first necessary time sending/receiving unit 31a of the first unit 3A.

As a method for the sending, undersea acoustic or optical communication can be used. It is also possible to perform communication by radio waves by providing an antenna on the sea surface through a buoy.

Here considered is a case where transmission and reception of acoustic waves is performed by dividing between the sea surface and the seabed into the layers shown in FIG. 8. In that case, a time necessary for an acoustic wave transmitted from the transmitter 11 in the first unit 3A to propagate to the sea surface becomes as follows.

$$\frac{d_1}{c_1\sin\theta_{0,1}}+\frac{d_2}{c_2\sin\theta_{0,2}}+\frac{d_3}{c_3\sin\theta_{0,3}}+\ldots+\frac{d_N}{c_N\sin\theta_{0,N}}=T_0 \quad (26)$$

On the other hand, a time necessary for the transmitted wave to be received by the second unit 3B since its reflection at the sea surface becomes as follows.

$$\frac{d_1}{c_1\sin\theta_{1,1}}+\frac{d_2}{c_2\sin\theta_{1,2}}+\frac{d_3}{c_3\sin\theta_{1,3}}+\ldots+\frac{d_N}{c_N\sin\theta_{1,N}}=T_1 \quad (27)$$

Accordingly, because the first unit 3A can find the time of scattering at the sea surface from the arrival time of a scattered wave from the sea surface, it can find also the time of arrival at the second unit 3B of this scattered wave from the sea surface.

That is, $T_1$ in the equation 27 can also be found. Accordingly, with only a single transmission, two equations with respect to respective ones of two different (reception) angles, corresponding to the equations 26 and 27, can be obtained. Then, if there are N-number of the second units 3B, N+1 number of different equations can be obtained. In other words, if N-number of the second units 3B are provided, N+1 number of different equations can be obtained with no need of varying the transmission direction angle variously at the transmission side, but with only transmission at a single transmission direction angle.

In that way, it becomes possible to acquire sound velocity distribution by the use of a small scale system even when transmitting acoustic waves from the transmitter at a smaller number of transmission direction angles than the number of the plurality of layers.

The present invention has been described above with reference to exemplary embodiments (and examples), but the present invention is not limited to the above-described exemplary embodiments (and examples). To the configurations and details of the present invention, various changes understandable to those skilled in the art may be made within the scope of the present invention.

This application is based upon and claims the benefit of priority from Japanese Patent Application No. 2012-258751, filed on Nov. 27, 2012, the disclosure of which is incorporated herein in its entirety by reference.

REFERENCE SIGNS LIST 2A to 2C environment measurement system
3A first unit
3B second unit
11 transmitter
12 first receiver
12b second receiver
13 transmission direction setting unit
14 first necessary time measurement unit
14b second necessary time measurement unit
15 layer setting unit
16 simultaneous equations set-up unit
17 simultaneous equations solving unit
18 sound velocity profile output unit
19 initial parameter setting unit
20 display unit
21 storage unit
22 map holding unit
23 matching unit
24 multi-stage layer setting unit (layer setting unit)
31a first necessary time sending/receiving unit
31b second necessary time sending/receiving unit

What is claimed is:

1. An environment measurement system comprising a first unit, the first unit including:
   a transmission unit which is located undersea and transmits an acoustic wave in a designated direction a plurality of times;
   a first reception unit which is located undersea and receives the acoustic wave reflected by a reflecting body at the sea surface or the seabed;
   a transmission direction setting unit which designates, to the transmission unit, transmission directions specified in advance by a user, so as to cause the transmission unit to transmit acoustic waves in the directions;
   a first necessary time measurement unit which, for each of the transmission directions, measures from transmission and reception times of the acoustic wave a time necessary for the acoustic wave to return, as a necessary time, and outputs an average of the measured necessary time as an average necessary time for each of the transmission directions;
   a layer setting unit which partitions between the sea surface and the seabed into layers each extending horizontally, at intervals of preset distances;
   a simultaneous equations set-up unit which sets up simultaneous equations using the transmission directions, the necessary times and the layer thicknesses and taking average sound velocities in the respective layers as unknown variables;
   a simultaneous equations solving unit which solves the simultaneous equations;
   an initial parameter setting unit which sets initial values necessary for the simultaneous equations solving unit to solve the simultaneous equations, as parameter initial values;
   a sound velocity profile output unit which creates a profile of sound velocities by determining solutions acquired by the simultaneous equations solving unit to be average sound velocities in the respective layers and arranging the average sound velocities in the respective layers in order of depth, and outputs the profile;
   a map holding unit which holds a seabed map including at least unevenness of the seabed as depth information; and
   a matching unit which derives seabed depths on the basis of the average necessary times for the respective transmission directions, corrects the seabed depths by unit of matching between the seabed depths and the seabed map, derives from which point of the seabed depths the acoustic wave is reflected, for each of the transmission directions, and thereby acquires corrected reflection depths, wherein
   the layer setting unit partitions between the sea surface and the seabed on the basis of the corrected reflection depths, where layer partitioning down to the smallest depth is performed at intervals of predetermined thicknesses, and layer setting from the smallest depth to the largest depth is performed on the basis of the reflection depths, allowing the number of layers and layer thicknesses to become different for different ones of the transmission directions.

2. The environment measurement system according to claim 1, further comprising:
   a second unit communicating with the first unit, wherein
   the first unit further include:
   a first necessary time sending/receiving unit which sends the transmission times to the second unit, and sends and receives necessary times to and from the second unit, and
   the second unit includes:
   a second reception unit which receives the acoustic wave transmitted from the transmission unit of the first unit and then reflected by the reflecting body;
   a second necessary time sending/receiving unit which receives the transmission times via the first necessary time sending/receiving unit, and sends the necessary times measured by the second unit to the first necessary time sending/receiving unit; and
   a second necessary time measurement unit which measures the necessary times, on the basis of times of reception by the second reception unit and the transmission times received via the second necessary time sending/receiving unit, and outputs the necessary times to the second necessary time sending/receiving unit.

3. The environment measurement system according to claim 1, wherein,
   when differences in average sound velocity are small among the layers, and the simultaneous equations set up by the simultaneous equations set-up unit accordingly can be approximated by linear simultaneous equations, the simultaneous equations solving unit calculates the average sound velocities according to the linear simultaneous equations.

4. The environment measurement system according to claim 3, comprising:
   a display unit which displays the average sound velocities in accordance with the sound velocity profile, at least in a form of character information or graphic information; and
   a storage unit which stores the sound velocity profile.

5. The environment measurement system according to claim 4, wherein
   the sound velocity profile output unit derives the sound velocity profile by acquiring:
   a sound velocity profile for from the sea surface to the installation depth of the system, using the necessary times of the respective acoustic waves reflected at the sea surface; and a sound velocity profile for from the installation depth of the system to the seabed, using the necessary times of the respective acoustic waves reflected at the seabed which is horizontally flat.

6. The environment measurement system according to claim 4, wherein the sound velocity profile output unit derives the sound velocity profile by acquiring:

a sound velocity profile for from the sea surface to the installation depth of the system, using the necessary times of the respective acoustic waves reflected at the sea surface; and a sound velocity profile for from the installation depth of the system to the seabed, using the necessary times of the respective acoustic waves reflected at the seabed which is in an inclined state or an uneven state.

7. An environment measurement method comprising:

transmitting an acoustic wave in a designated direction a plurality of times;

receiving the acoustic wave reflected by a reflecting body at the surface or the seabed;

designating transmission directions specified in advance by a user, so as to cause acoustic waves to be transmitted in the directions;

measuring, for each of the transmission directions, from transmission and reception times of the acoustic wave a time necessary for the acoustic wave to return, as a necessary time, and for outputting an average of the measured necessary time as an average necessary time for each of the transmission directions;

partitioning between the sea surface and the seabed into layers each extending horizontally, at intervals of preset distances;

setting up simultaneous equations using the transmission directions, the necessary times and the layer thicknesses and taking average sound velocities in the respective layers as unknown variables;

solving the simultaneous equations;

simultaneous equations solving process to solve the simultaneous equations, as parameter initial values;

creating a profile of sound velocities by determining solutions acquired by the simultaneous equations solving process to be average sound velocities in the respective layers and arranging the average sound velocities in the respective layers in order of depth, and for outputting the profile;

holding a seabed map including at least unevenness of the seabed as depth information; and deriving seabed depths on the basis of the average necessary times for the respective transmission directions, correcting the seabed depths by unit of matching between the seabed depths and the seabed map, deriving from which point of the seabed depths the acoustic wave is reflected, for each of the transmission directions, and thereby acquiring reflection depths, wherein the layer setting process partitions between the sea surface and the seabed on the basis of the corrected reflection depths, where layer partitioning down to the smallest depth is performed at intervals of predetermined thicknesses, and layer setting from the smallest depth to the largest depth is performed on the basis of the reflection depths, allowing the number of layers and layer thicknesses to become different for different ones of the transmission directions.

8. An environment measurement method comprising:

transmitting an acoustic wave in a designated direction a plurality of times;

receiving the acoustic wave reflected by a reflecting body at the sea surface or the seabed;

designating transmission directions specified in advance by a user, so as to cause acoustic waves to be transmitted in the directions;

measuring, for each of the transmission directions, from transmission and reception times of the acoustic wave a time necessary for the acoustic wave to return, as a necessary time, and for outputting an average of the measured necessary time as an average necessary time for each of the transmission directions;

partitioning between the sea surface and the seabed into layers each extending horizontally, at intervals of preset distances;

setting up simultaneous equations using the transmission directions, the necessary times and the layer thicknesses and taking average sound velocities in the respective layers as unknown variables;

solving the simultaneous equations;

setting initial values necessary for the simultaneous equations solving process to solve the simultaneous equations, as parameter initial values;

creating a profile of sound velocities by determining solutions acquired by the simultaneous equations solving process to be average sound velocities in the respective layers and arranging the average sound velocities in the respective layers in order of depth, and for outputting the profile;

receiving the transmission times and sending measured necessary times;

receiving the acoustic waves transmitted in the transmission process and then reflected by the reflecting body, and for measuring times of the receptions;

receiving the transmission times sent in the first necessary time sending/receiving process and sending the measured necessary times; and performing a second necessary time measurement process for measuring the necessary times, on the basis of the transmission times received in the second necessary time sending/receiving process and the reception times received in the second necessary time sending/receiving process.

* * * * *